US012669200B1

(12) United States Patent
Wenning et al.

(10) Patent No.: US 12,669,200 B1
(45) Date of Patent: Jun. 30, 2026

(54) MOUNTABLE DUST HOSE CONNECTOR SYSTEM

(71) Applicant: ROCKLER COMPANIES, INC., Medina, MN (US)

(72) Inventors: Daniel Wenning, Minnetonka, MN (US); Reem Emerson, Minneapolis, MN (US); Jay Owens, Maple Grove, MN (US)

(73) Assignee: ROCKLER COMPANIES, INC., Medina, MN (US)

( * ) Notice: Subject to any disclaimer, the term of this patent is extended or adjusted under 35 U.S.C. 154(b) by 0 days.

(21) Appl. No.: 19/184,281

(22) Filed: Apr. 21, 2025

Related U.S. Application Data

(63) Continuation-in-part of application No. 17/950,335, filed on Sep. 22, 2022, now Pat. No. 12,313,194.

(60) Provisional application No. 63/247,903, filed on Sep. 24, 2021.

(51) Int. Cl.
| | |
|---|---|
| *F16L 33/22* | (2006.01) |
| *F16L 3/12* | (2006.01) |
| *F16L 27/02* | (2006.01) |
| *F16L 41/02* | (2006.01) |
| *F16L 43/00* | (2006.01) |

(52) U.S. Cl.
CPC .............. *F16L 33/22* (2013.01); *F16L 27/02* (2013.01); *F16L 3/1222* (2013.01); *F16L 41/021* (2013.01); *F16L 41/023* (2013.01); *F16L 43/008* (2013.01)

(58) Field of Classification Search
CPC ......... F16L 33/22; F16L 27/02; F16L 3/1222; F16L 41/021; F16L 41/023; F16L 43/008
USPC .......................................................... 138/106
See application file for complete search history.

(56) References Cited

U.S. PATENT DOCUMENTS

| | | |
|---|---|---|
| 704,936 A | 7/1902 | Scherer |
| 1,179,995 A | 4/1916 | Beckwith |
| 1,464,318 A | 8/1923 | Hauf |
| 2,459,382 A | 1/1949 | Hollub |
| 5,957,506 A | 9/1999 | Stepp |

OTHER PUBLICATIONS

"The Sheet Metal Kid 12" Adjustable Duct Elbow 90 Degree HVAC (accessed at https://www.amazon.com/Duct-Elbow-Degree-Sheet-Metal/dp/B00BLUBGCY?th=1 on Jan. 31, 2024), 9 pages.
"Master Flow 6 in. 90 Deg. Round Adjustable Elbow" (accessed at https://www.homedepot.com/p/Master-Flow-6-in-90-Deg-Round-Adjustable-Elbow-B90E6/100062966#overlay on Jan. 31, 2024), 13 pages.

*Primary Examiner* — David R Deal
(74) *Attorney, Agent, or Firm* — Mai D. Lauer; Westman, Champlin & Koehler, P.A.

(57) ABSTRACT

An apparatus includes a body and a first ridge band. The body has first and second ports at opposite ends thereof. The first ridge band is disposed on a substantially cylindrical portion of the body. The first ridge band includes a plurality of dentils and a gap between adjacent dentils of the plurality of dentils. The plurality of dentils are raised from a surface of the substantially cylindrical portion of the body. The gap is elongated in an axial direction of the substantially cylindrical portion of the body and terminates at a stop that is raised from the surface.

20 Claims, 14 Drawing Sheets

MOUNTABLE DUST HOSE CONNECTOR SYSTEM

CROSS REFERENCE TO RELATED APPLICATIONS

This application is a continuation-in-part of U.S. patent application Ser. No. 17/950,335, filed Sep. 22, 2022, which claims the benefit of priority from U.S. Provisional Patent Application No. 63/247,903, filed Sep. 24, 2021; the contents of these priority applications are hereby incorporated by reference.

BACKGROUND

Woodworking routinely results in the generation of sawdust and other particulate material that is desirably collected, such as by vacuum, and directed away from a work area. For that purpose, dust collection hoses are used for attachment to woodworking tools such as routers, saws, and large drills.

In some established workshops, extensive metal duct runs are installed between each tool station and a central vacuum system. Thus, a user has ready access to a dust removal line at each dust producing station. However, such metal ducting is expensive, and run configurations are not easily changed when the user adds or moves stations.

SUMMARY

In an exemplary embodiment, an apparatus comprises a body and a first ridge band. The body has first and second ports at opposite ends thereof. The first ridge band is disposed on a substantially cylindrical portion of the body. The first ridge band comprises a plurality of dentils and a gap between adjacent dentils of the plurality of dentils. The plurality of dentils are raised from a surface of the substantially cylindrical portion of the body. The gap is elongated in an axial direction of the substantially cylindrical portion of the body and terminates at a stop that is raised from the surface.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views. All descriptions are applicable to like and analogous structures throughout the several embodiments, unless otherwise specified.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art that fall within the scope of the principles of this disclosure.

The figures may not be drawn to scale. In particular, some features may be enlarged relative to other features for clarity. Moreover, where terms such as above, below, over, under, top, bottom, side, right, left, vertical, horizontal, etc., are used, it is to be understood that they are used only for ease of understanding the description. It is contemplated that structures may be oriented otherwise.

DETAILED DESCRIPTION

Figure 18:
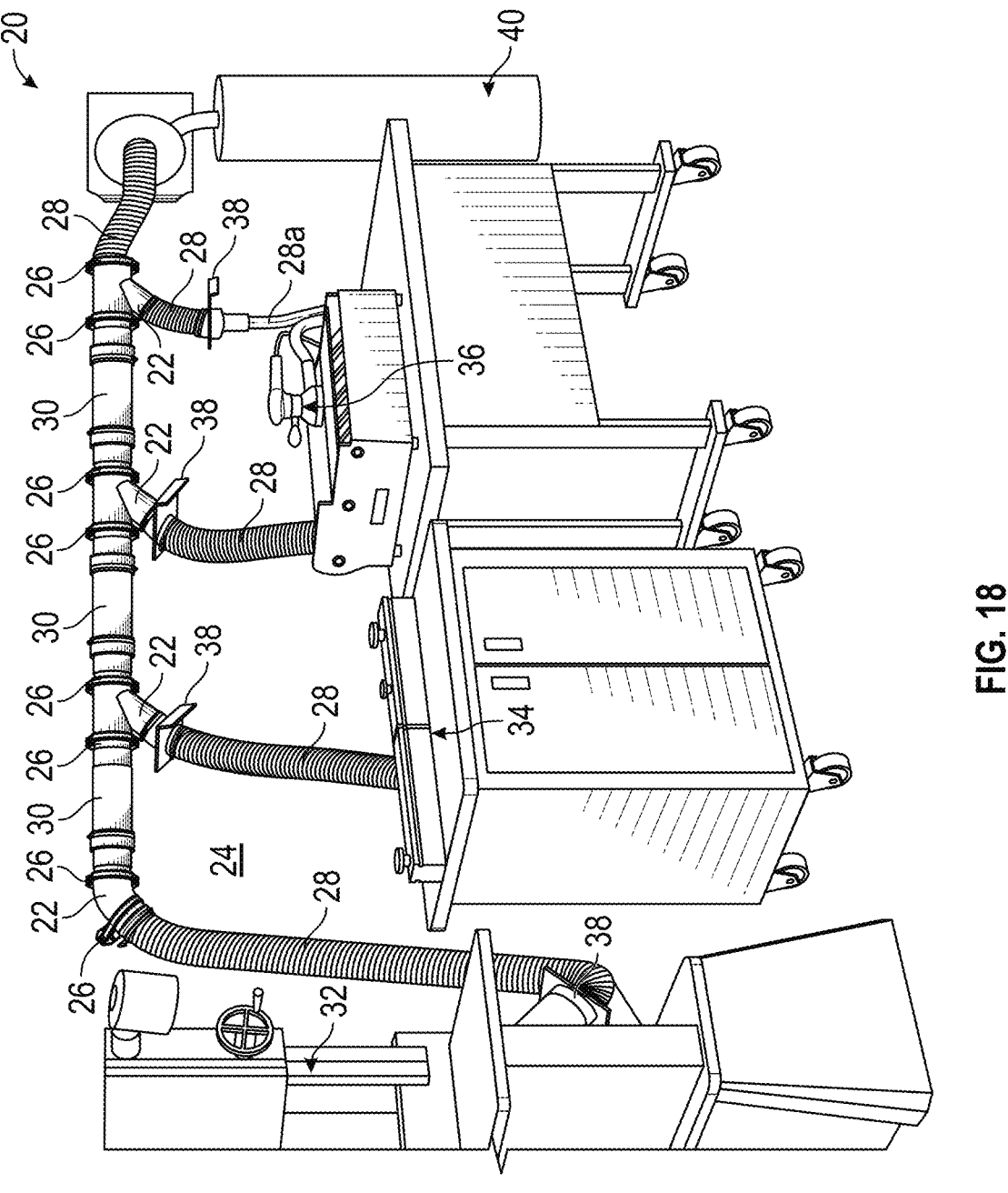
FIG. 18 is a perspective view of a dust management system including two of the assemblies of FIG. 17 and other connector assemblies using the disclosed dust hose connector system components.
Figure 20:
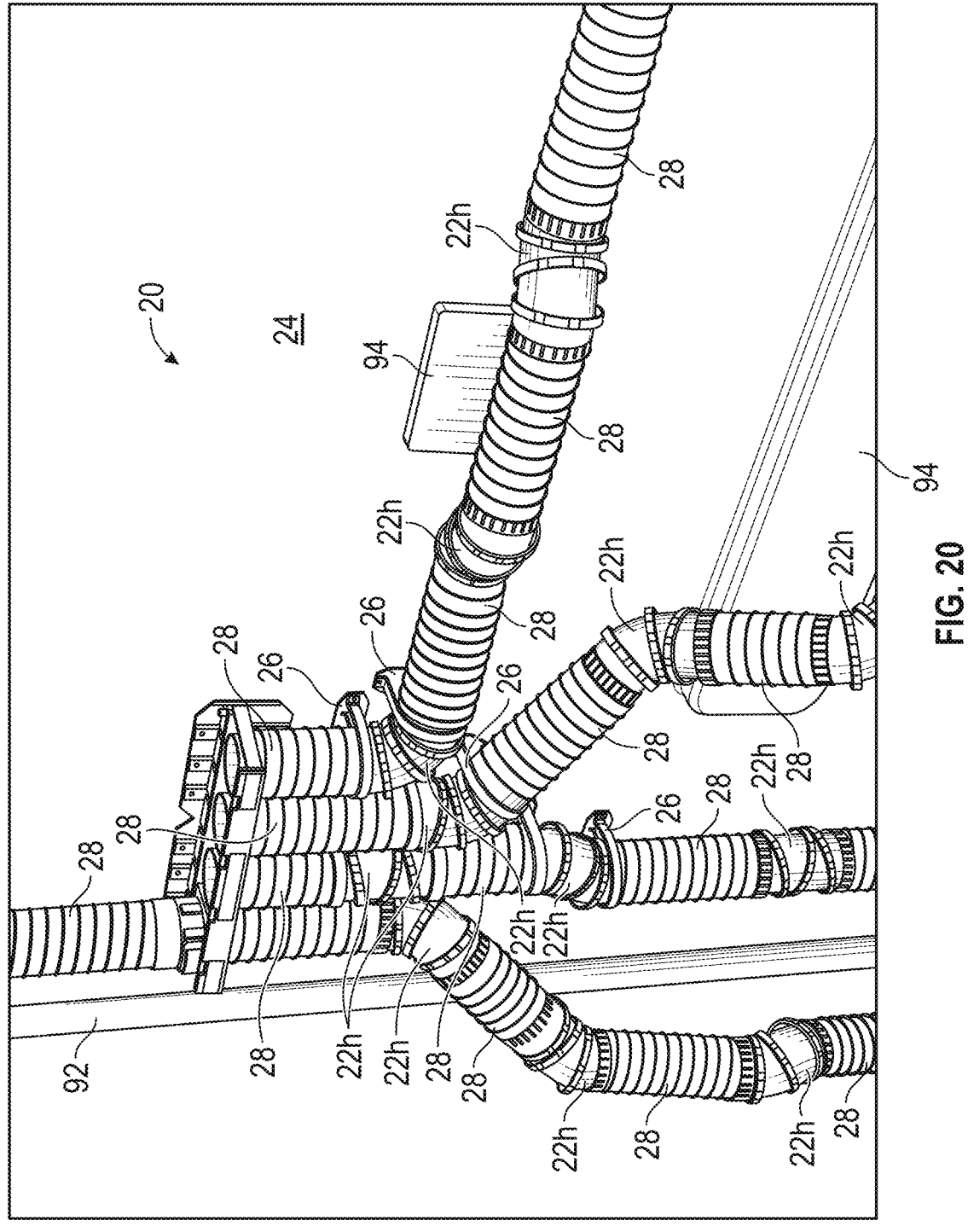
FIG. 20 is a perspective view of a portion of a dust management system including connector assemblies using primarily articulated connectors in various configurations and hoses.

Components of the disclosed mountable dust hose connector system can be used, as shown in FIGS. 18 and 20, to allow installation of a modular, customized dust management system to provide a user with the advantages of a central vacuum system without requiring extensive permanent ducting work. System 20 includes a plurality of hose connectors 22 attached to a surface 24, such as a wall or floor for example, by brackets 26. End ports of the hose connectors 22 are configured for attachment to a hose 28, pipe 30, or other conduit capable of conveying moving fluid such as dust laden air. Often, a hose must traverse a distance from the dust source to a dust collection unit such as a central vacuum system. To traverse this distance, in some cases several hoses will need to be connected end to end. Moreover, in some cases, it is desirable for such a run of several connected hoses to change direction and/or span a structural gap, such as around a corner or from a table or work bench surface to a wall surface and then to a floor surface, for example.

In an installation of system 20, a user may choose to connect a hose 28 where flexibility in the conduit is desired. For increased stability where flexibility is not important, the user can connect a pipe 30 to a port of a connector 22. As shown in an exemplary installation of system 20, each of the ends of a hose that is remote from the connector 22 is attached to a dust producing woodworking tool station, such as one including a saw 32, router 34, or sander 36, for example. Moreover, the installation can include a hose 28 that has an open end that is not attached to a tool; that hose can be used as a flexible vacuum hose to reach any area that may accumulate dust, such as a floor, for example. A blast gate 38 can be positioned at any point in the system 20 to allow for selective opening and closing of fluid flow routes in the system. In an exemplary embodiment, the conduit network leads to a vacuum 40.

Figure 2:
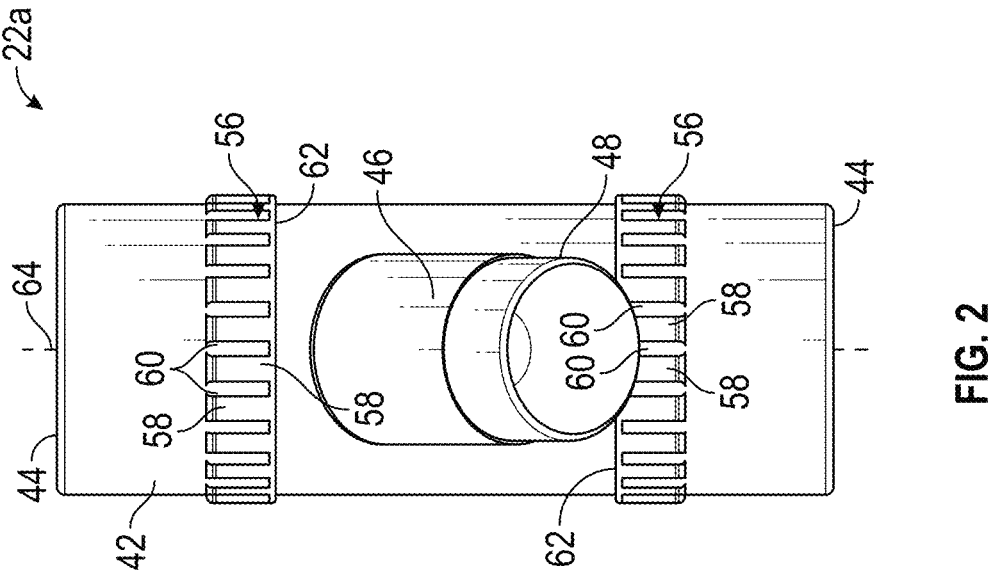
FIG. 2 is an elevation view of the Y-connector of FIG. 1.
Figure 1:
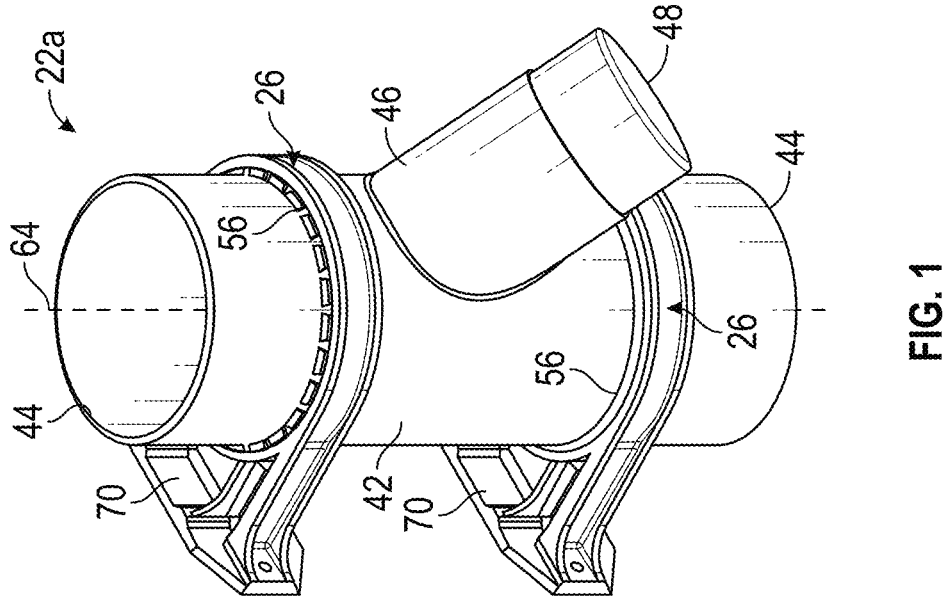
FIG. 1 is a perspective view of a first exemplary embodiment of a mountable dust hose connector assembly with a first exemplary Y-connector.
Figure 4:
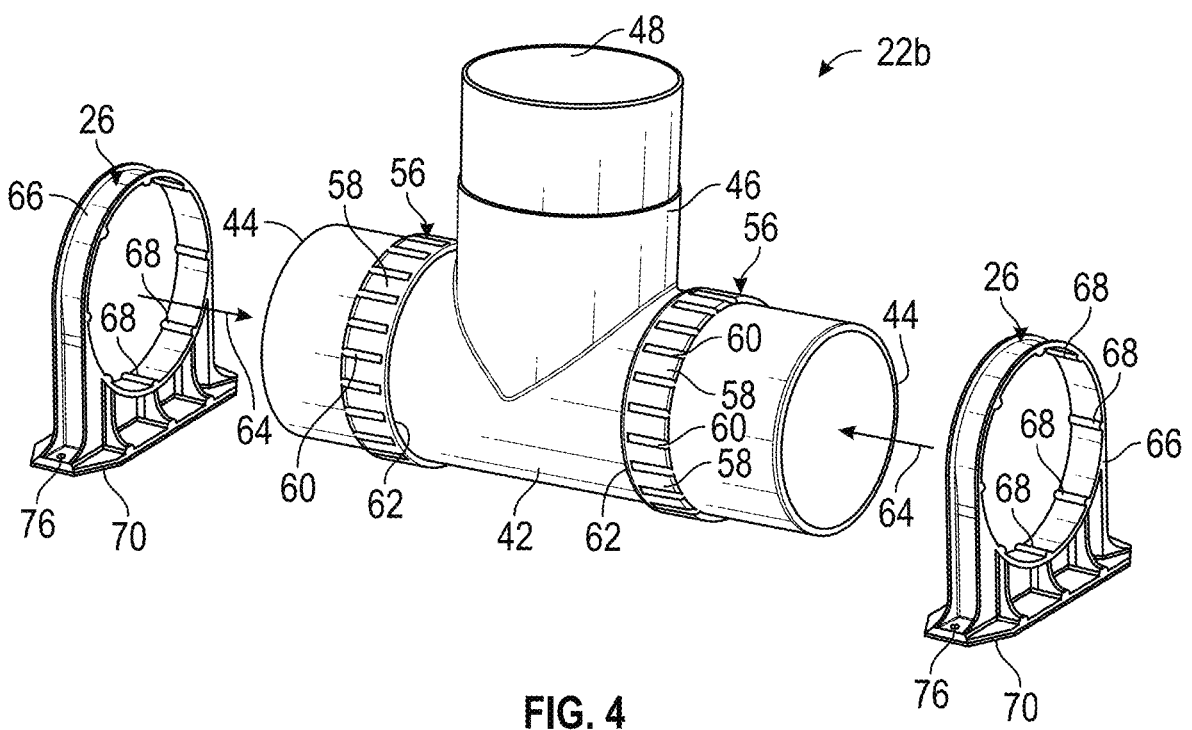
FIG. 4 is a perspective view of two connector brackets positioned for assembly with a T-connector.
Figure 5:
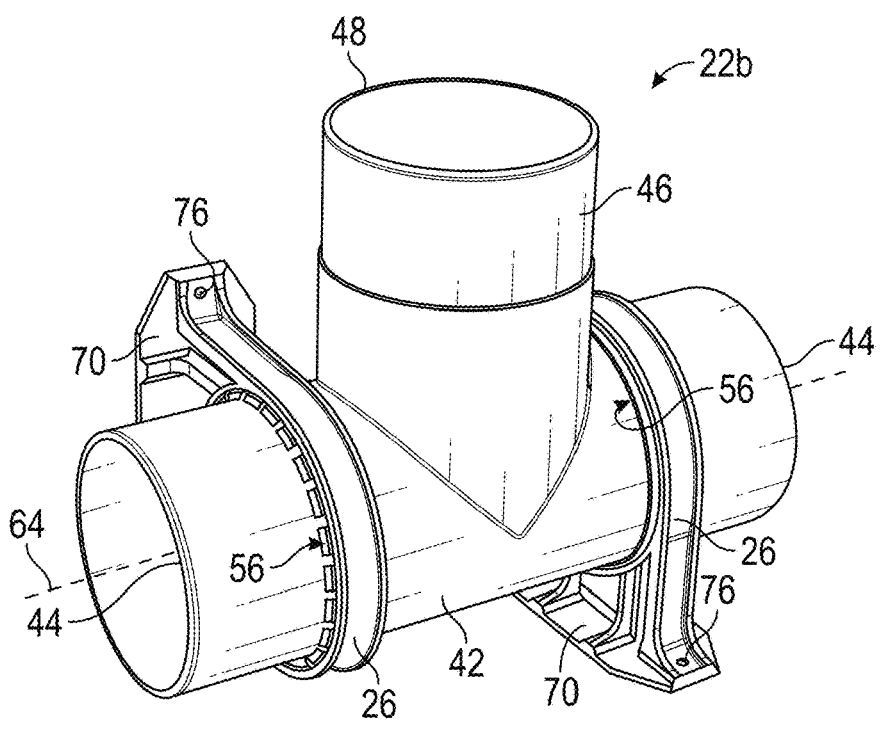
FIG. 5 is a perspective view of the components of FIG. 4 in an assembled first configuration.
Figure 6:
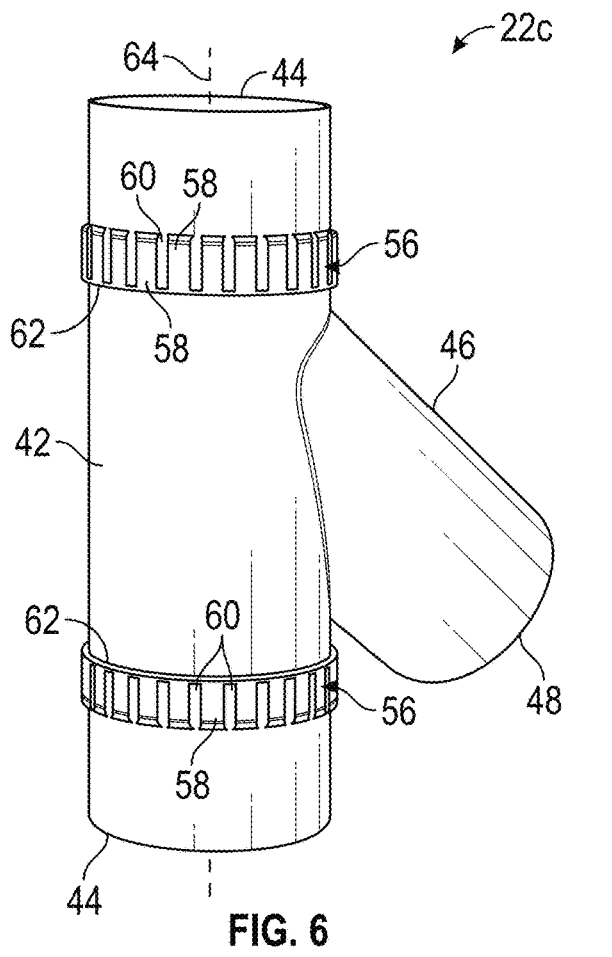
FIG. 6 is a perspective view of another exemplary Y-connector.
Figure 7:
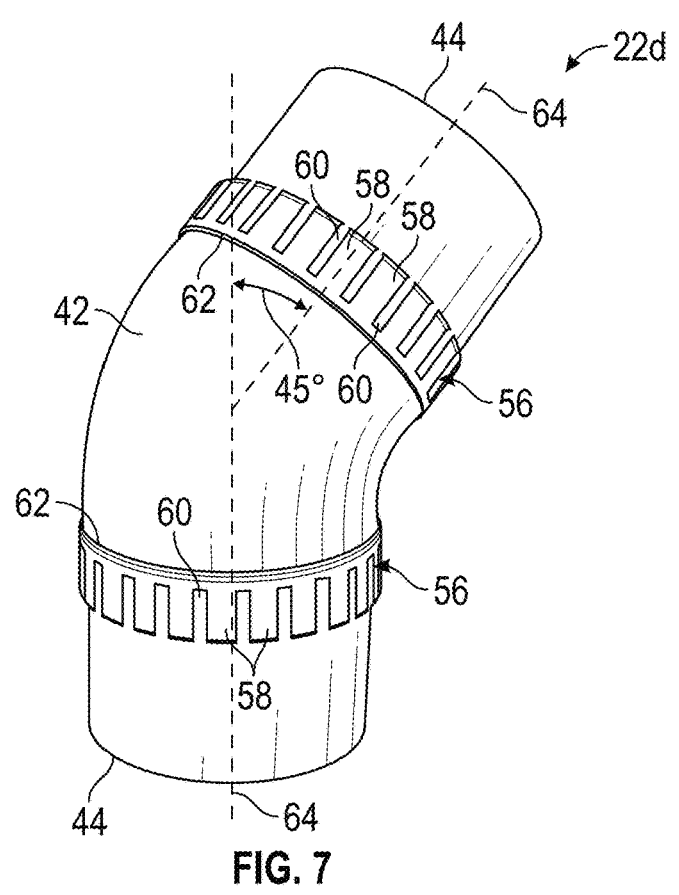
FIG. 7 is a perspective view an exemplary 45-degree elbow connector.
Figure 8:
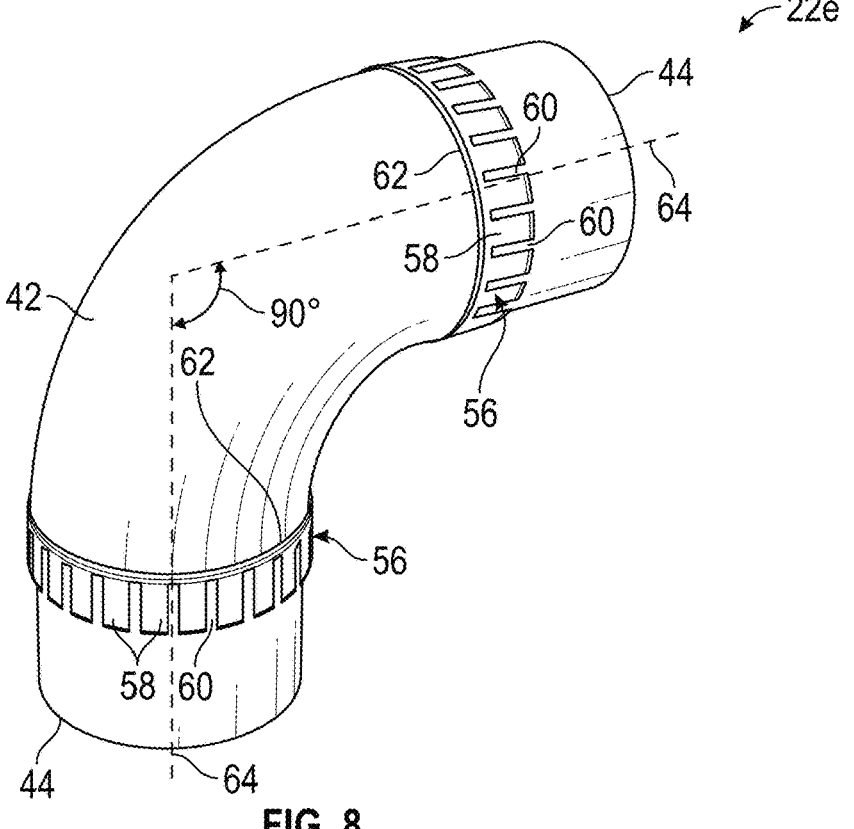
FIG. 8 is a perspective view of an exemplary 90-degree elbow connector.
Figure 9:
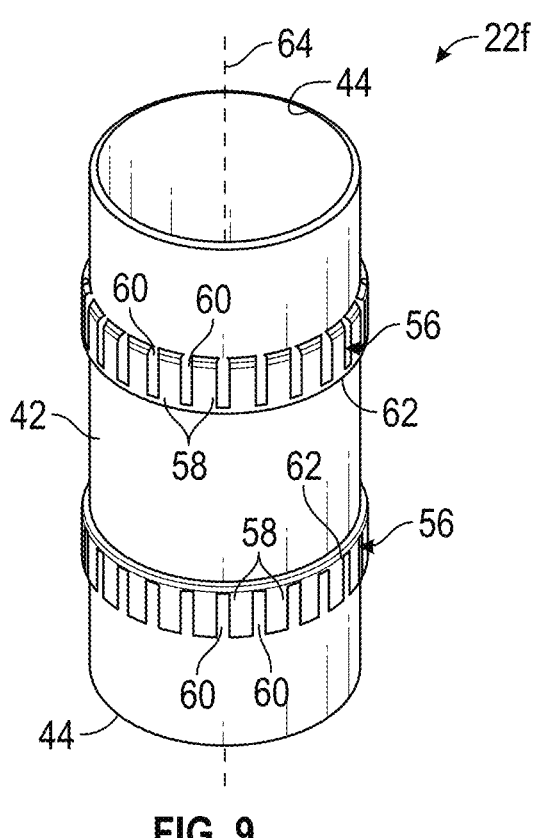
FIG. 9 is a perspective view of an exemplary 4-inch diameter straight connector.
Figure 10:
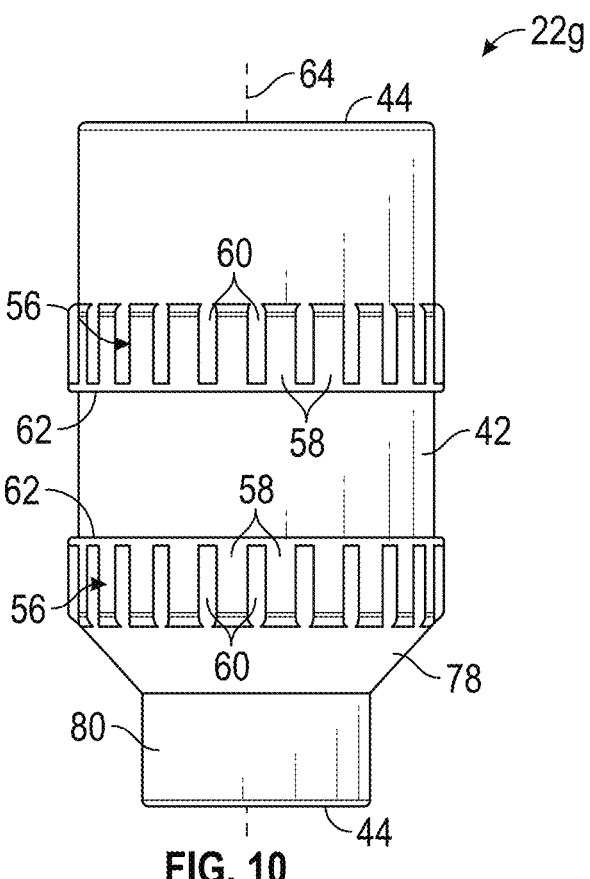
FIG. 10 is a side view of an exemplary hose splice connector having ends configured to fit a 4-inch diameter hose on one side and a 2.5-inch diameter hose on the other side.

In the disclosed system 20, several configurations of a connector 22 are described and illustrated. The reference numeral 22 will be used to refer to the entire collection of different configurations of connectors. When a particular configuration is discussed, distinguishing lowercase letters may be used. For example, FIGS. 1 and 2 show a 4-inch to 2.5-inch Y-connector 22a. FIGS. 4 and 5 show a 4-inch T-connector 22b. FIG. 6 shows a 4-inch to 4-inch Y-connector 22c. FIG. 7 shows a 45-degree elbow connector 22d. FIG. 8 shows a 90-degree elbow connector 22e. FIG. 9 shows a straight splice connector 22f. FIG. 10 shows a 4-inch to 2.5-inch straight splice connector 22g. FIGS. 19A through 19F show various configurations of an articulating connector 22h. While illustrated as a 4-inch diameter articulating connector, this configuration can also be provided in a 2.5-inch diameter size or any other size.

Many of these connectors 22 include a main trunk 42 or body (whether articulated or static) having end ports 44. In the case of a Y-connector or T-connector, a branch 46 also includes a branch port 48. While particular configurations of trunk, body and branch diameters and orientations is illustrated, it is to be understood that other variations of connectors not shown can also be used in the disclosed system 20 and in accordance with these descriptions. In the illustrated embodiments, a common diameter for a larger body or trunk 42 or branch 46 is about 4-inches. Moreover, a common diameter for a smaller body, trunk 42 or branch 46 is about 2.5-inches. However, it is to be understood that these dimensions can be changed for fitting other hoses, pipes and conduits, for example in a system used in Europe or another country that does not use standard United States measurements. Moreover, while connectors 22 are illustrated with either one branch or no branch, it is contemplated that additional branches 46 may attach to a trunk 42 of a connector 22. Moreover, while particular attachment angles of branches 46 in a Y-connector and a T-connector are illustrated, a branch 46 can be attached to a trunk 42 in orientations in a connector 22 other than those illustrated. Moreover, while particular angular bending orientations in a trunk 42 of an elbow connector are illustrated in connectors 22d and 22e, other bend angles can also be used. Additionally, while the elbow connectors 22d, 22e are illustrated with commonly sized end ports 44, it is contemplated that the end ports of a single connector 22 may differ in size from each other, whether they are connected by a trunk 42 and/or a branch 46 of the connector 22.

FIG. 1 is a perspective view of a first exemplary embodiment of a mountable dust hose connector assembly of the described system 20. As shown in FIG. 1, Y-connector 22a has trunk 42 with end ports 44 and a branch 46 with a branch port 48. Each of the ports 44, 48 is configured for attachment to an air conduit such as a hose 28 or pipe 30 by mechanical engagement using friction and/or a fastener such as hose clamp 50 and/or adapter 52, 54 (shown in FIGS. 11-17). Connector 22a includes two 4" ports 44 and a single 2.5" port 48. The smaller port 48 is located on an end of cylindrical branch 46 that extends from the primary trunk 42 of connector 22a at a non-right angle. Accordingly, connector 22a has a shape reminiscent of a letter Y and is therefore referred to as a Y-connector.

Various configurations of connectors 22 are described herein, and particular embodiments of connectors carry a lower-case letter, such as 22a, 22b, 22c, 22d, 22e, 22f, 22g and 22h. However, in many respects, the connectors are similar in structure and function. Thus, when referring to any of the connectors, this description will make reference to connector 22. In exemplary embodiments, connectors 22 include at least two ridge bands 56, usually disposed on trunk 42.

FIG. 2 is an elevation view of connector 22a. As shown in FIG. 2, in an exemplary embodiment, each of ridge bands 56 is configured as a row of raised dentils 58 uniformly spaced apart by gaps 60 at least in a direction toward ports 44. In an exemplary embodiment, a continuous annular ridge 62 is located on a side of the band 56 away from ports 44, the ridge 62 serving as a stop ring to prevent connector brackets 26 from sliding too far along main trunk 42 in sliding directions 64 onto connector 22 (labeled in FIG. 4). In an exemplary embodiment, a sliding direction is along a longitudinal axis 64 that is orthogonal to a plane of the respective port 44. Additionally, in an exemplary embodiment, each of the dentils 58 and gaps 60 is elongated in a direction that is parallel to the axis 64. In an exemplary embodiment, each ridge band 56 is configured as a circular ring on a trunk 42 having a circular cross section at a location of the ridge band 56, the circles being symmetrical about axis 64.

Figure 3:
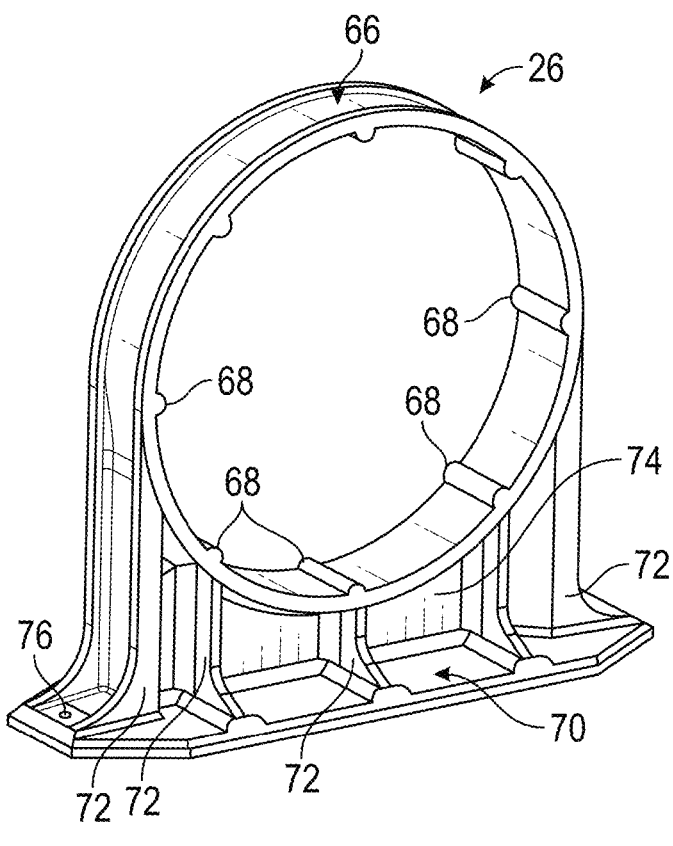
FIG. 3 is a perspective view of an exemplary connector bracket.

As shown in FIG. 3, in an exemplary embodiment, connector bracket 26 includes an annulus 66 having a plurality of uniformly spaced apart interior ribs 68. Annulus 66 is connected to a relatively flat base 70 with structural braces 72. In an exemplary embodiment, panels 74 of material span the spaces between annulus 66, base 70 and braces 72 to further lend rigidity to connector bracket 26. In an exemplary embodiment, annulus 66 is configured as a circular ring that is symmetrical about axis 64, and each of the interior ribs 68 is configured to extend parallel to axis 64.

FIG. 4 shows two connector brackets 26 positioned for assembly with connector 22b, in which all three ports 44, 48 have a 4" nominal diameter and the connector branch 46 is connected to the main trunk 42 at a 90-degree right angle. Because of this shape, connector 22b is referred to as a "T-connector." In another embodiment, the branch 46 may have a different diameter than the trunk 42.

As shown in FIG. 4, to assemble components of the dust hose connector system 20, a connector bracket 26 is slid onto main trunk 42 of a connector 22 from port 44 toward ridge band 56, as indicated by axial sliding direction arrows 64. Each interior rib 68 of connector bracket 26 is configured for alignment with a gap 60 of ridge band 56. For assembly of the system, interior ribs 68 of connector bracket 26 slide into gaps 60 between the dentils 58 of ridge band 56. Such sliding is arrested when ribs 68 contact annular ridge 62 of band 56. Because each rib 68 is held in a gap 60 between adjacent dentils 58, relative rotation of an assembled connector 22 and bracket 26 is prevented when annulus 66 is fitted over band 56, as shown in FIGS. 1 and 5, for example.

In an exemplary system 20, each connector bracket 26 has fewer ribs 68 than a number of gaps 60 in a band 56 of a suitable connector 22. The relatively high number of evenly spaced gaps 60 of band 56 allows a user to find a desired orientation of base 70 relative to features of the connector 22. In each selected orientation, each interior rib 68 of connector bracket 26 is aligned with a gap 60 of a corresponding ridge band 56. For example, as shown in FIG. 5, one connector bracket 26 is shown with its base 70 oriented vertically for attachment to a vertically disposed surface such as a cabinet or wall, while a second connector bracket 26 is attached to connector 22b so that its base 70 is oriented horizontally for attachment to a horizontally disposed surface such as a shelf, bracket, floor or table surface. In an exemplary embodiment, base 70 includes an aperture 76 in one or more locations to allow the passage of a fastener such as a nail or screw, in order to attach bracket 26 to a surface 24 such as a floor, wall, ceiling, workbench or table, for example.

In an exemplary embodiment, adjacent interior ribs 68 of connector bracket 26 are separated by 45 radial degrees, and adjacent gaps 60 of band 56 are separated by 15 radial degrees. Having a fewer number of ribs 68 than a number of gaps 60, such as half or one-third or one-quarter, for example, allows bracket 26 to easily slide onto and off of band 56 with little unintended interference or binding. A user can easily slide connector bracket 26 off of a band 56 (along a direction opposite the attachment direction shown by the arrows 64 in FIG. 4) in order to rotate either bracket 26 or connector 22 (or both) for reassembly and thus to achieve the desired relative rotational position of the bracket 26 and connector 22 in such an assembly.

FIGS. 6-10 and 19A-19F illustrate other configurations of connectors 22 that are suitable for use with bracket 26. While particular configurations of connectors are illustrated and described, it is contemplated that the teachings of this description can be used to form connectors of other configurations, such as a four-way connector having two branch segments extending from the main trunk, for example.

FIGS. 1, 4, 12-14 and 17 show a connector 22 with brackets 26 aligned so that bases 70 are oriented to attach to a single planar surface 24. FIGS. 5, 11, 15 and 16 show an assembly configuration in which the two bases 70 of respective brackets 26 are oriented orthogonally to each other. It is contemplated that the two brackets 26 that attach to a single connector 22 can have any independent orientations made possible by relative rotation of bracket 26 and band 56, as long as ribs 68 are held in gaps 60. In an application where finer gradations of rotational placement are desired, more gaps 60 can be provided between narrower dentils 58 than those depicted in the illustrations. Moreover, in some embodiments, a connector 22 may be used with single bracket 26. Additionally, while two ridge bands 56 are illustrated on each connector 22, it is contemplated that as many bands can be provided as there are trunk or branch segments on the connector 22. For example, especially for the T-connector 22b shown in FIGS. 4 and 5, where the connector branch 46 has a common diameter as the main trunk 42, the connector branch 46 could have a ridge band 56 provided thereon, even though none is illustrated on the exemplary embodiment. Each of the exemplary connectors 22 has one or more ridge bands 56 formed to mate (as described above) with an associated annulus 66 of a connector bracket 26.

FIG. 6 is a perspective view of an exemplary connector 22c which is a 4-inch to 4-inch Y-connector, wherein port 48 of connector branch 46 has a common 4" diameter with ports 44 of main trunk 42. FIG. 7 is a perspective view of connector 22d, configured as a 45-degree elbow connector, having a 45-degree bend in trunk 42. FIG. 8 is a perspective view of connector 22e, which is a 90-degree elbow connector having a 90-degree bend in trunk 42. In an exemplary embodiment, a sliding direction is along a longitudinal axis 64 that is orthogonal to a plane of the respective port 44. Thus, in each of the connectors 22d, 22e of FIGS. 7 and 8, the axis 64 at one port 44 is not parallel to the axis 64 at the other port 44. In connector 22d of FIG. 7, the two axes 64 intersect at a 45-degree angle; in connector 22e of FIG. 7, the two axes 64 intersect at a 90-degree angle.

FIG. 9 is a perspective view of a straight splice connector 22f, wherein the two ports 44 of the trunk 42 have a common diameter. While the illustrated connector 22f has a 4-inch diameter, a straight splice connector may have any size. FIG. 10 is a side view of a straight splice connector 22g, wherein the two ports 44 of the main trunk 42 have different diameters. As shown in the illustrated embodiments, two ridge bands 56 are provided on the larger diameter main trunk 42. A frustoconical neck-down portion 78 of connector 22g connects the main trunk 42 and a smaller diameter portion 80. In an exemplary embodiment, portion 80 has a constant diameter configuration, rather than a tapered structure, to easily fit hoses and adapters, as described in more detail below.

Figure 11:
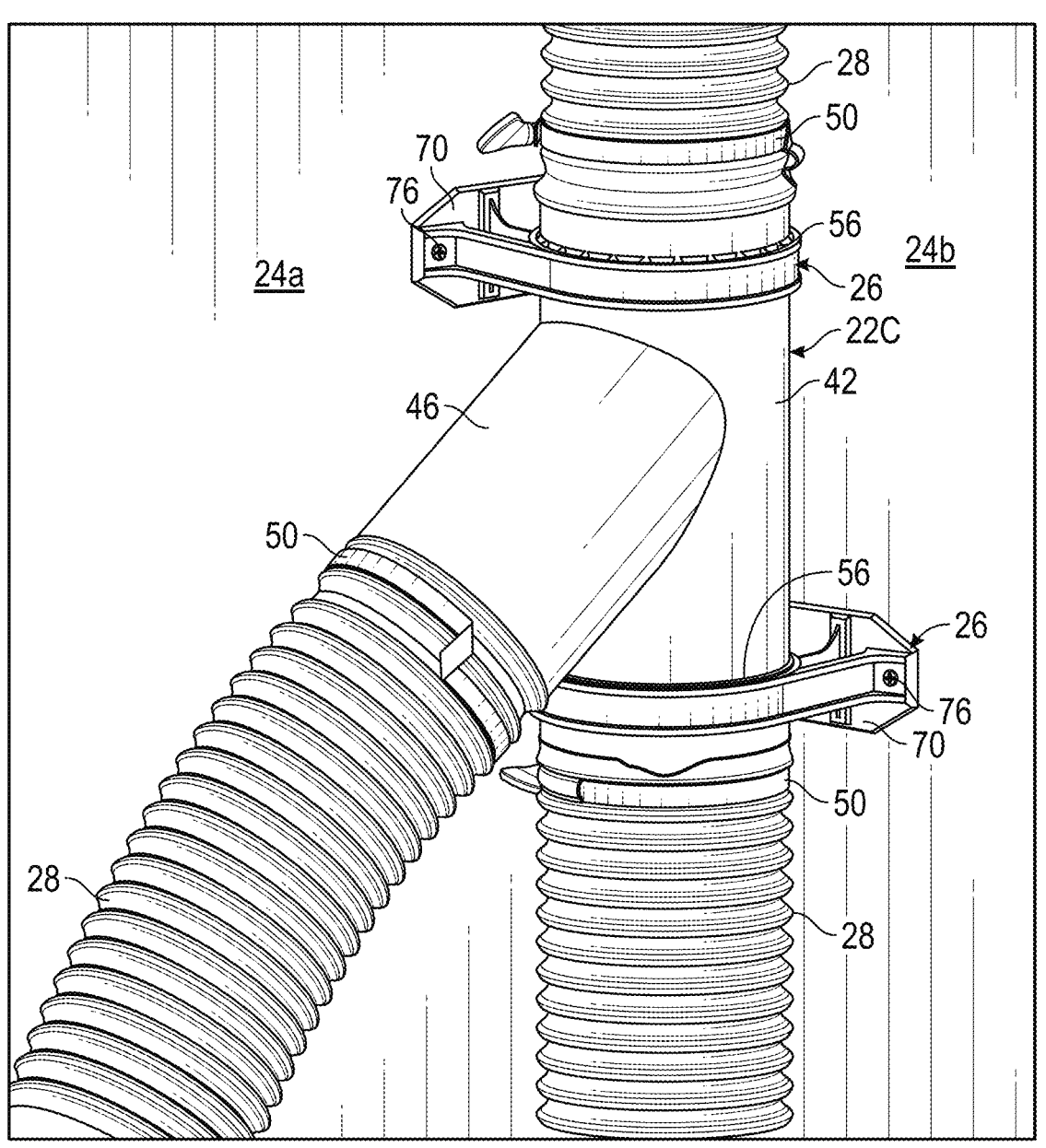
FIG. 11 is a perspective view of an assembly using the connector of FIG. 6, two connector brackets attached to perpendicularly oriented surfaces, and a 4-inch diameter hose connected to each port.

FIG. 11 is a perspective view of an assembly of connector 22c (shown separately in FIG. 6) attached to two wall surfaces 24a, 24b that meet at an inside corner. Thus, the bases 70 of the two brackets 26 connected to bands 56 of connector 22c are oriented perpendicularly to each other. A flexible hose 28 is attached to connector 22c at each of its ports 44, 48 by a spring clamp ring 50. In other implementations of a connector, other conduits may be connected to its ports. Moreover, a selectively closable blast gate 38 can be installed between a connector trunk or branch and a conduit to allow an air passage to be opened or closed as desired. (See FIG. 18).

Figure 12:
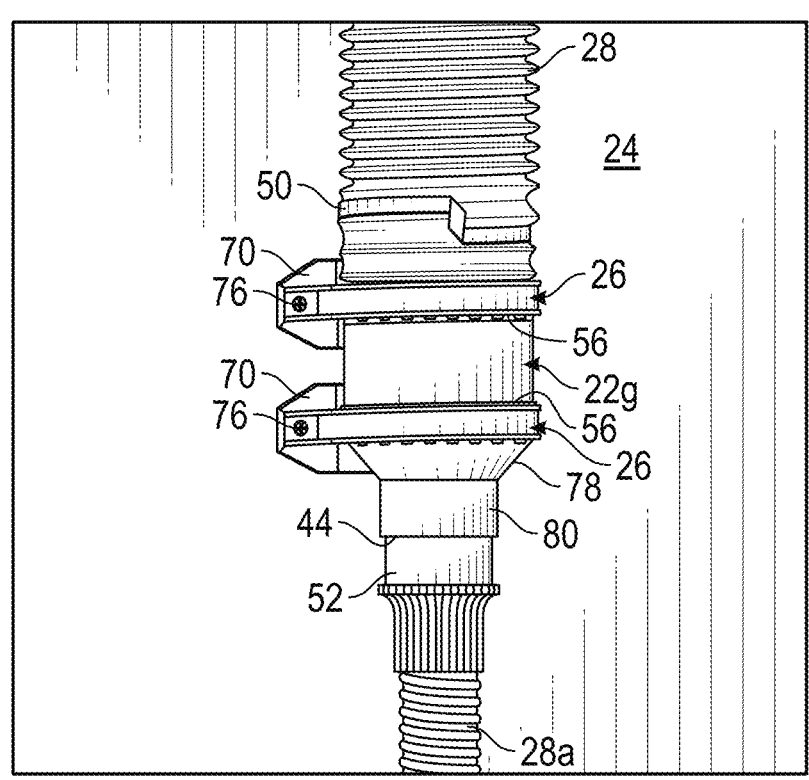
FIG. 12 is a perspective view of an assembly including the connector of FIG. 10, two connector brackets attached to a common surface, and hoses of different diameters attached to the ends thereof.

FIG. 12 is a perspective view of connector 22g with hose 28 connected to a larger port 44 with hose clamp 50. A flexible hose adapter 52 snugly fits into port 44 of small diameter portion 80 to connect a smaller diameter hose 28a to connector 22g. In an exemplary embodiment, hose adapter 52 is formed of a flexible, resilient material such as rubber that is configured to conform to a shape of the inner diameter of portion 80, thereby not requiring a clamp to hold the smaller diameter hose 28 onto connector 22g. The assembly is secured by brackets 26 on ridge bands 56 to surface 24 via fasteners inserted into apertures 76.

Figure 13:
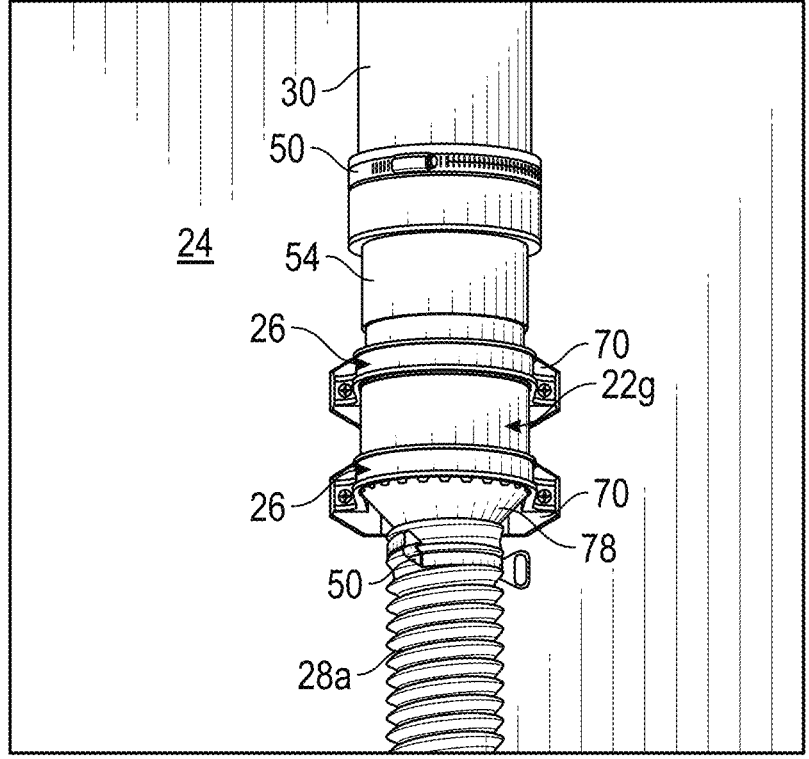
FIG. 13 is a perspective view of an assembly including the connector of FIG. 10 with a larger end attached to a pipe adapter and a smaller end attached to a hose.

FIG. 13 is a perspective view of connector 22g used in another assembly. In this case, a pipe adapter 54 frictionally fits over the larger diameter port 44. A rigid pipe 30 is secured to the pipe adapter 54 by clamp 50. In an exemplary embodiment, pipe 30 is a standard component made of polyvinyl chloride (PVC), though other materials for pipes and conduits can also be used in system 20. At the other end of connector 22g, a small diameter flexible hose 28a is connected to small diameter portion 80 by hose clamp 50.

Figure 14:
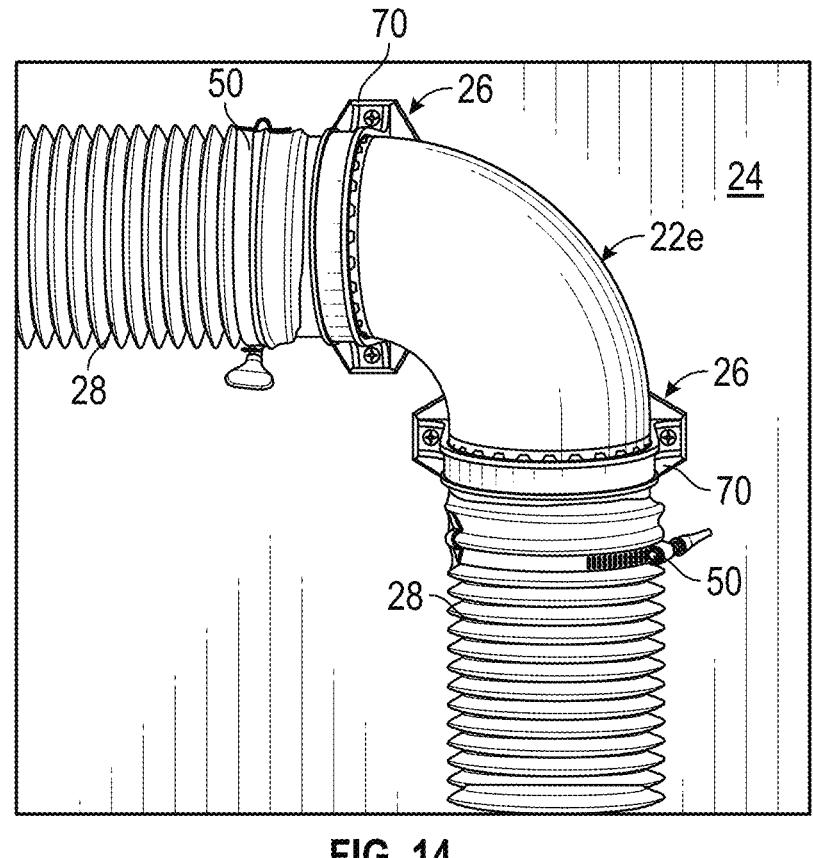
FIG. 14 is a perspective view of an assembly using the connector of FIG. 8 and two connector brackets attached to a common surface, with a hose attached to each port of the connector.
Figure 15:
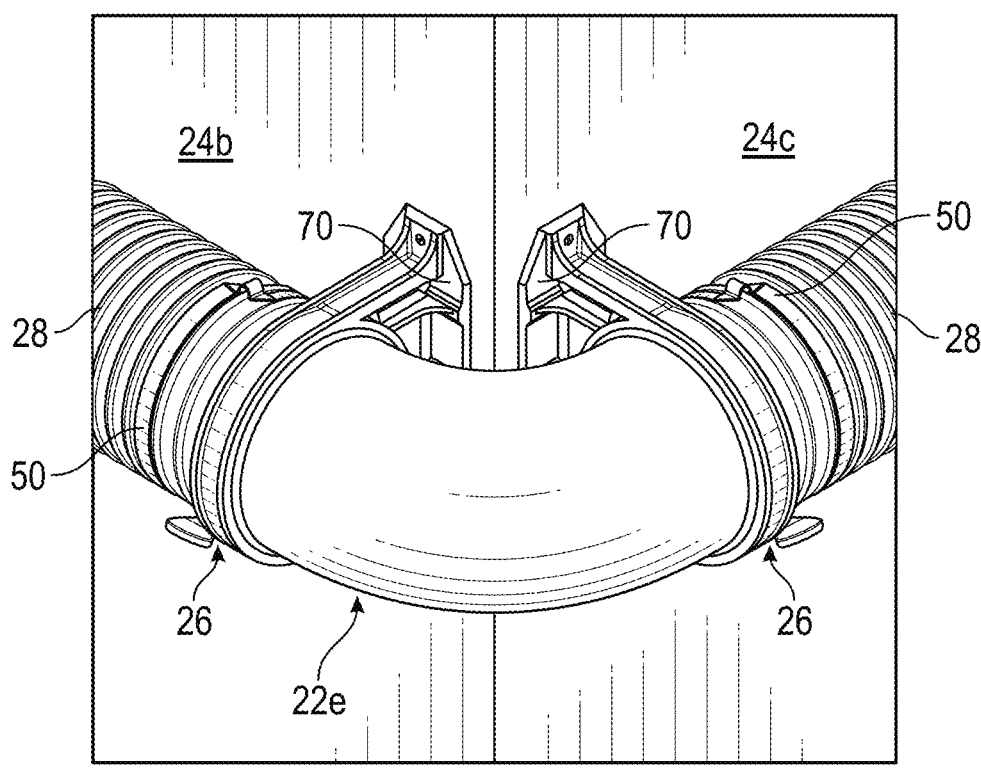
FIG. 15 is an assembly including the connector of FIG. 8, with two connector brackets attached to mutually perpendicular surfaces that meet at an outside corner, and with a hose attached to each port.
Figure 16:
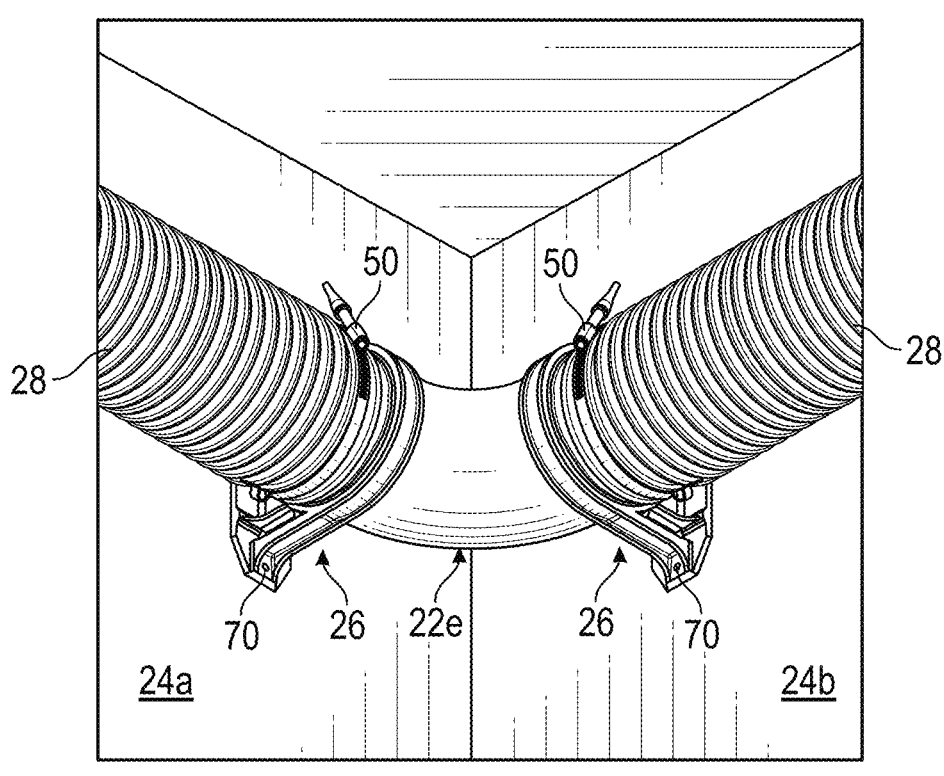
FIG. 16 is a perspective view of an assembly including the connector of FIG. 8, two connector brackets attached to mutually perpendicular surfaces that meet at an inside corner, and a hose attached to each port.

FIGS. 14, 15 and 16 show different assemblies using 90-degree elbow connector 22e with a hose 28 attached to each port with a hose clamp 50. In FIG. 14, the assembly is mounted by brackets 26 to a single surface 24. In FIG. 15, the assembly is mounted to two surfaces 24b, 24c that meet at an outside corner. In FIG. 16, the assembly is mounted to two surfaces 24a, 24b that meet at an inside corner.

Figure 17:
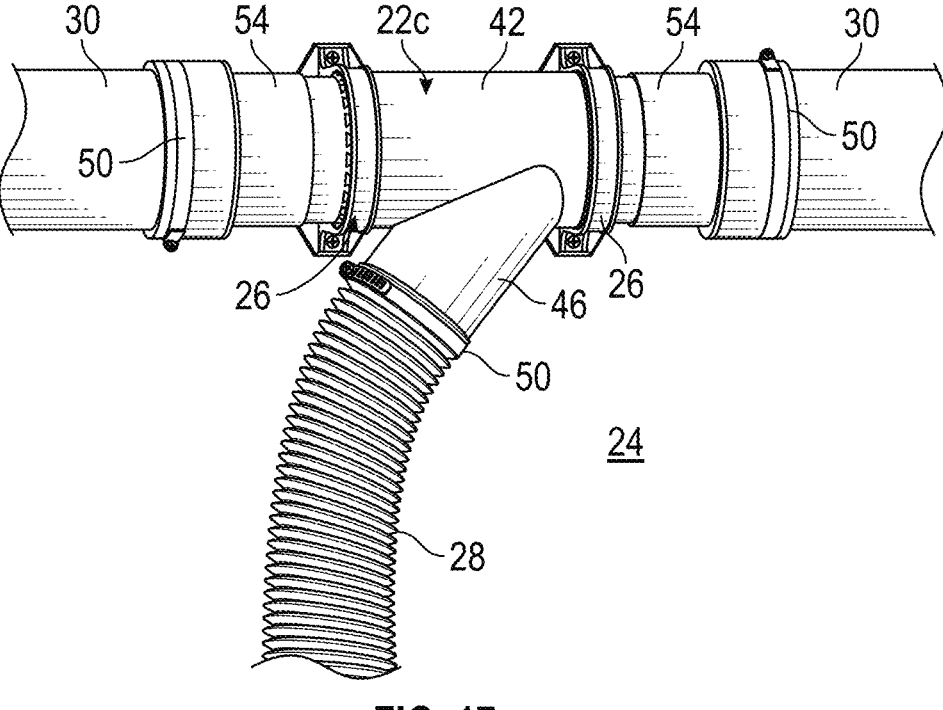
FIG. 17 is a perspective view of an assembly including the connector of FIG. 6 with two connector brackets attached to a common surface, two pipe adapters attached to two ports of the connector, and a hose attached to a port on the branch of the connector.

FIG. 17 is a perspective view of an assembly of connector 22c (shown separately in FIG. 6) attached to wall surface 24. A flexible hose 28 is attached to connector 22c at port 48 at the end of branch 46 by a spring clamp ring 50. At each end of trunk 42, a pipe adapter 54 is frictionally connected at ports 44. A pipe 30 is inserted into an opposite end of the pipe adapter 54; the pipe 30 is held to each pipe adapter 54 by a spring clamp ring 50.

FIG. 18 is a perspective view of a dust management system including two of the assemblies of FIG. 17 and other connector assemblies using the disclosed dust hose connector system components. It is to be understood that the orientation of each connector 22 within an assembly of one or more brackets 26 can be different than shown.

For example, referring to FIG. 1, the connector 22a can be assembled with brackets 26 so that connector branch 46 faces up, down, or to the left or right compared to the illustrated configuration. Moreover, as shown in FIG. 5, while connector branch 46 is illustrated as extending upward, it could in other arrangements relative to brackets 26 be configured to extend sideways or at an angle relative to the illustrated wall and floor. Other variations in positional attachment of brackets 26 to a connector 22 will be evident to users based on the descriptions herein.

As shown in FIG. 5, for example, once both brackets 26 are attached to surface(s) 24 with fasteners passed through apertures 76 and into the wall or floor surface 24, it is evident that such fastening thereby fixes an orientation of connector 22 within the assembly. With such attachment, the brackets 26 cannot be slid off of the bands 56, thereby securing the connector 22 within the bracket assembly. Thus, hoses 28, pipes 30 and other conduits attached to the connector 22 at ports 44, 48 are securely held in position and do not move during use, even when high velocity air and particulate matter travel through the connector 22 and its attached conduits.

Figure 19A:
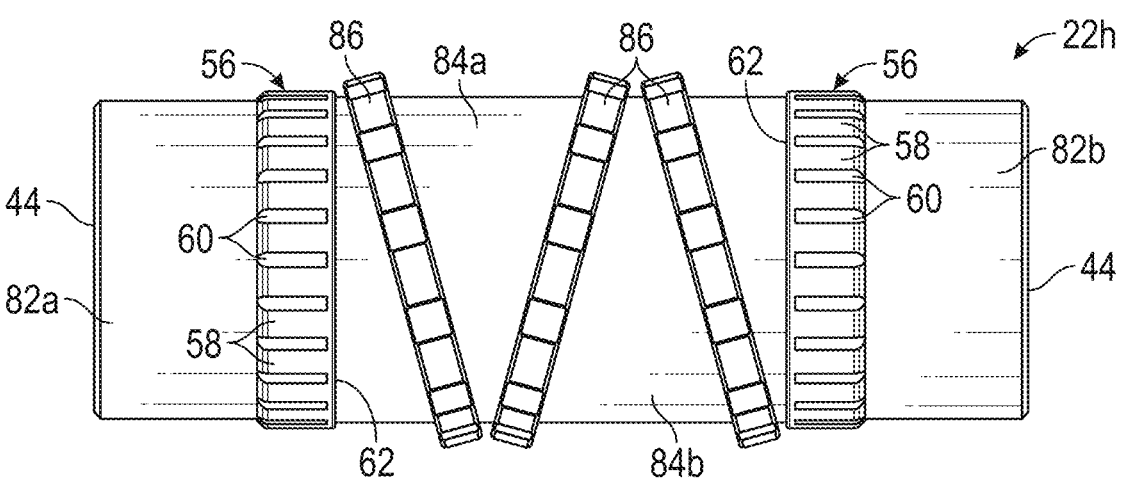
FIG. 19A is a side view of an exemplary articulating connector.

FIGS. 19A through 19F show various configurations of an articulating connector 22h. In an exemplary embodiment, connector 22h includes two ends 82, which are designated as 82a and 82b for ease of distinguishing between these ends in this discussion. Between the ends 82 are disposed to wedge sections 84, which are labeled in the drawings as 84a and 84b. Each of these sections 82, 84 is connected at angled openings 88 by rings 86; rings 86 hold the adjacent sections together 82, 84 in mutually rotatable relationship. The rings 86 can have an outer surface texture of raised and lowered areas as illustrated, or they may be smooth. In an exemplary embodiment, each of the end sections 82 has a ridge band 56 thereon for attachment to bracket 26 as explained above. FIG. 19A and its vertical cross-sectional representation at FIG. 19B both show articulating connector 22h in a straight configuration that can be used in place of connector 22f of FIG. 9, for example.

As with the other connectors 22, the articulating connector 22h can be provided in any diameter size. In an exemplary embodiment, each of the end sections 82 has a ridge band 56 including dentils 58 separated by gaps 60 facing an end port 44 of the ridge band 56. The dentils 58 are joined at annular ridge 62 at the opposing side of ridge band 56, proximate angled opening 88 and ring 86. These ridge bands 56 are attachable to brackets 26 in the manners described above with respect to the other connectors 22. In an exemplary embodiment, each of the end sections 82 at its inner angled opening 88, opposite end ports 44, is angled at an angle alpha (α) of about 75 degrees on one side and a diametrically opposed angle (β) of about 105 degrees on an opposite side.

The end sections 82 rotatably cooperate with wedge sections 84, which are also configured with complementary openings 88 as illustrated. Each of the wedge sections 84 is attached to an adjacent wedge section 84 or end section 82 by ring 86 that wraps around protrusions 90 to hold the sections 82, 84 together while allowing mutual rotation at the interfacing openings 88. The rings 86 may be configured with raised and depressed portions as shown to provide for enhanced grip, or they may be smooth or have other textures. Rings 86 also prevent air leaks at the interfacing openings 88.

Figure 19B:
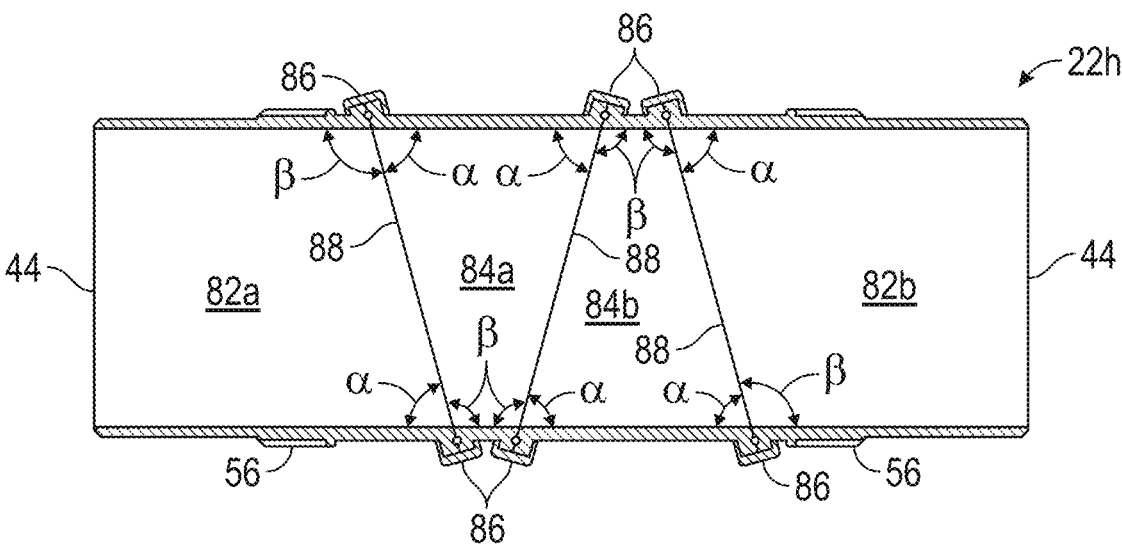
FIG. 19B is a vertical cross-section through the connector of FIG. 19A.
Figures 19C, 19D:
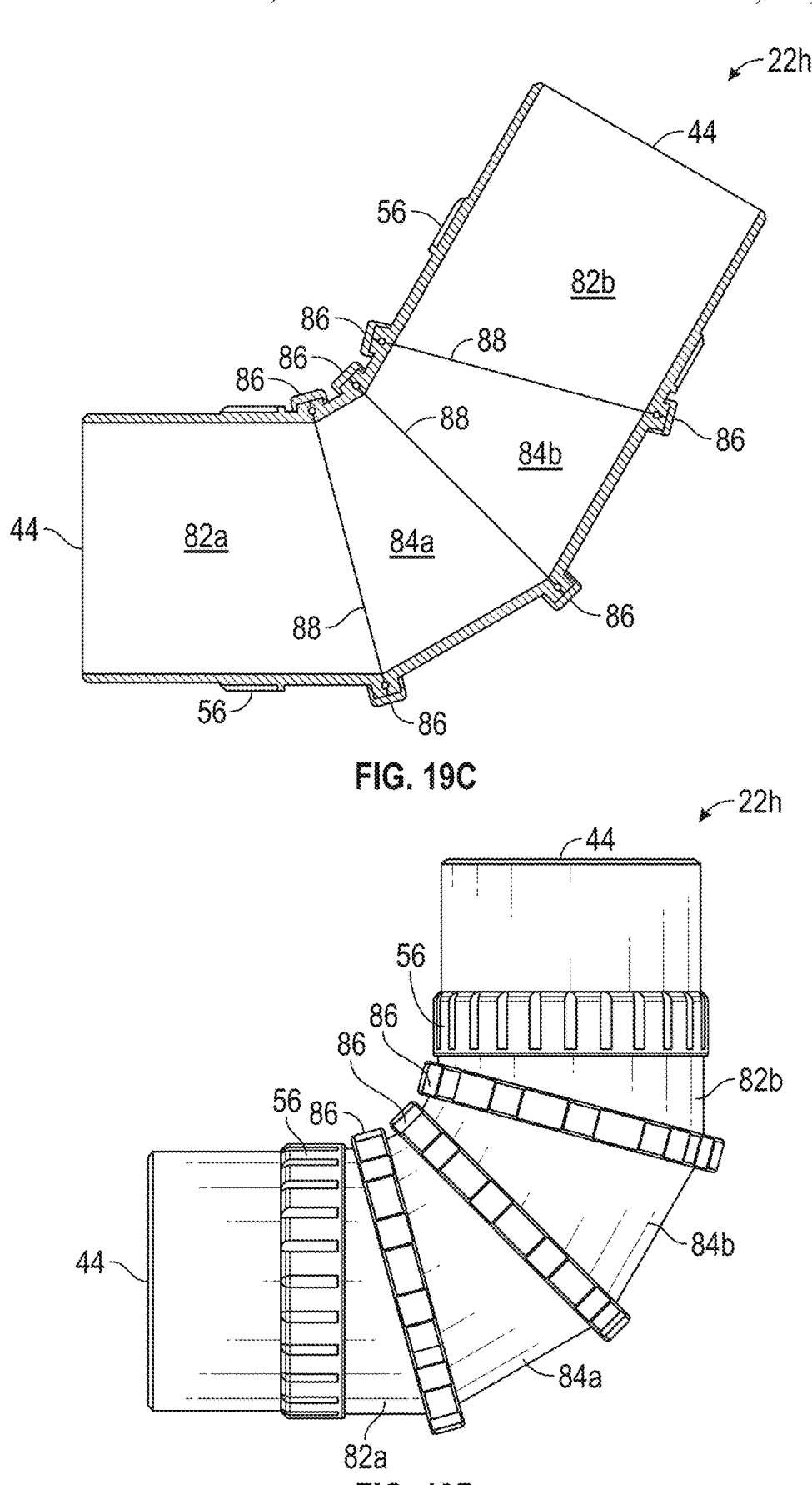
FIG. 19C is a cross-sectional view of the connector of FIG. 19A with the first (left as illustrated) wedge section rotated 180 degrees relative to each of the first (left) end section and the second wedge section.
FIG. 19D is a side view of the articulating connector with the second (top as illustrated) end section rotated 180 degrees from the configuration of FIG. 19C.

FIG. 19C shows a configuration of the articulating connector 22h in which wedge section 84a has been rotated 180 degrees relative to end section 82a at their interface of angled openings 88. Moreover, wedge section 84a is also rotated 180 degrees relative to adjacent wedge section 84b at 180 degrees.

Figure 19E:
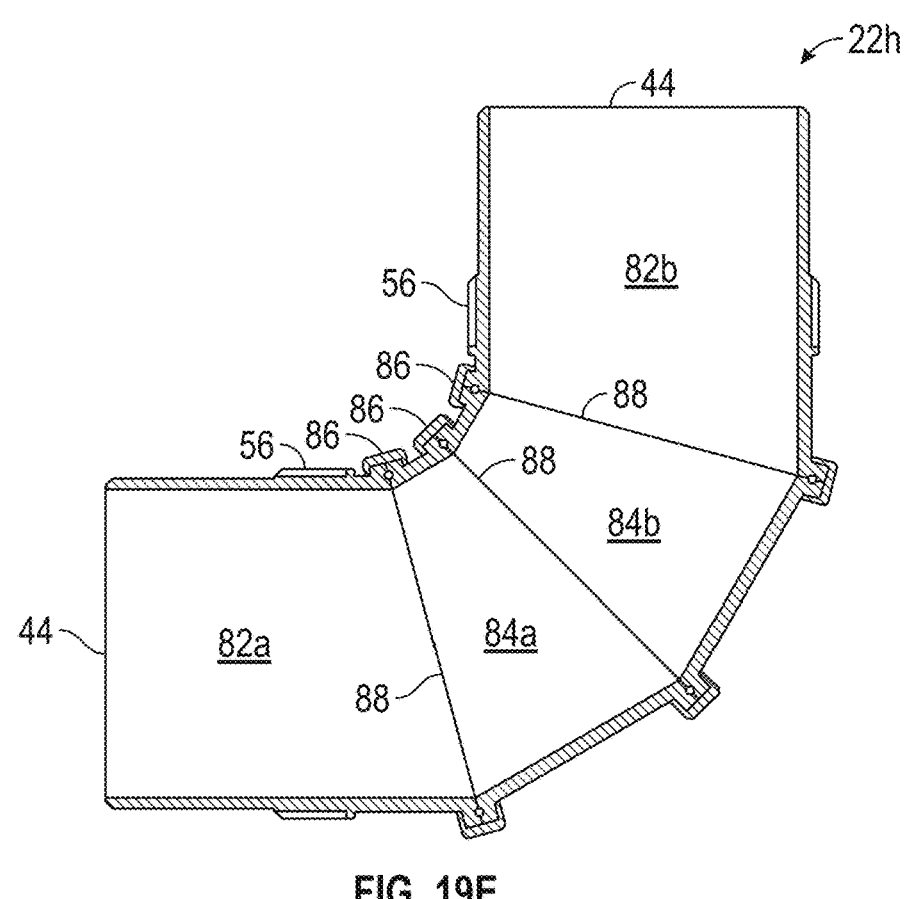
FIG. 19E is a vertical cross section through the articulating connector as configured in FIG. 19D.

FIGS. 19D and 19E show a 90 degree elbow configuration that is obtained by rotating end section 82b another 180 degrees relative to wedge section 84b. Thus, an articulating connector 22h thus configured can substitute for 90 degree elbow connector 22e of FIG. 8.

Figure 19F:
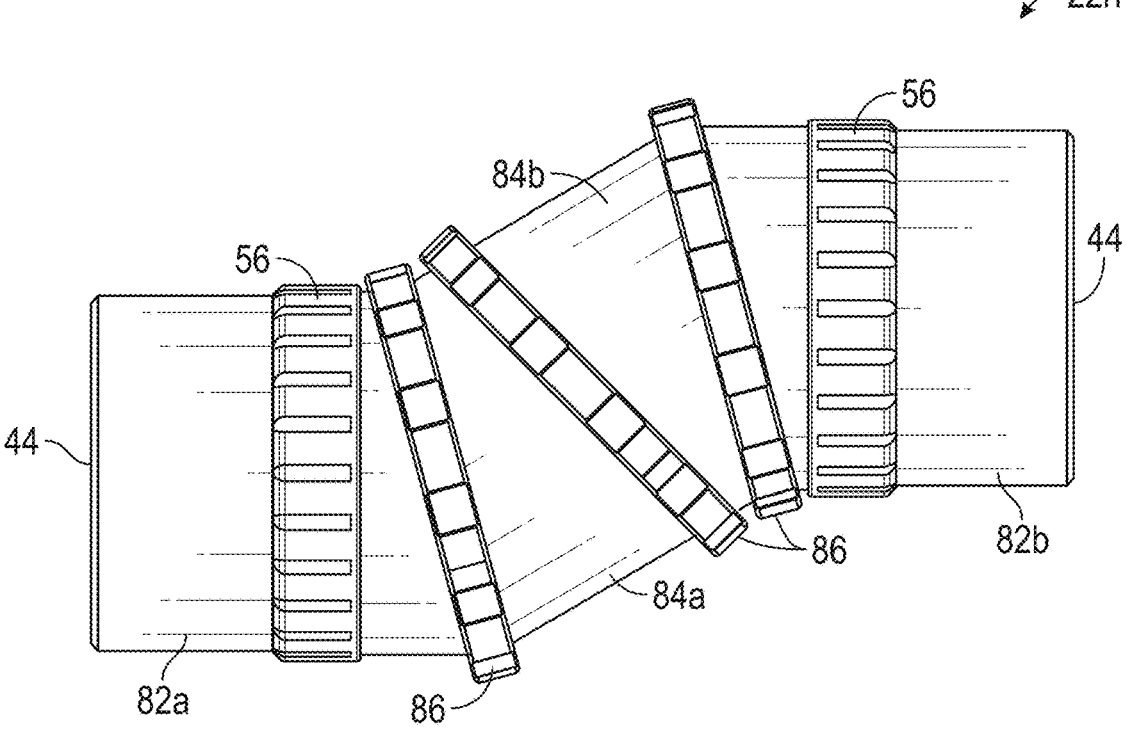
FIG. 19F is a side view of the articulating connector with the second wedge section rotated 180 degrees from the configuration of FIGS. 19D and 19E.

FIG. 19F shows a configuration of articulating connector 22h obtained, for example, by starting with the straight configuration of FIGS. 19A and 19B and rotating the end section 82a 180 degrees relative to section 84a; there is no rotation between the wedge sections 84a and 84b; the end section 82b is rotated 180 degrees with respect to wedge section 84*b*. Thus, it can be seen that the articulating connector 22*h* can be configured into many different configurations by rotating the sections 82, 84 with respect to each other. Moreover, while the illustrations show rotations about 180 degrees for ease of illustration and understanding, it is to be understood that a section 82, 84 can be rotated with respect to an adjacent section at any radial rotation angle.

For example, FIG. 20 shows an assembly of many articulating connectors 22*h* attached to hoses 28 and also attached by brackets 26 to a wall surface 24. The different articulating connectors 22*h* having many different angled configurations. Thus, use of the articulating connector 22*h* in system 20 is advantageous for routing hoses 28 and pipes 30 around features such as pipe 92 and boxes 94. For circumventing a shallow feature such as the upper box 94, only slight deviation from the straight configuration for connector 22*h* is needed, so that hose 28 remains close to wall 24 for a low-profile system 20. This is particularly advantageous in tight spaces where other connectors may not offer a desired amount of customization.

Non-limiting, exemplary embodiments of a system and a method of its use are described. For example, an exemplary system 20 comprises a first bracket 26 and a connector 22. The first bracket 26 comprises a first base 70 and a first annulus 66. The first base 70 comprises a first attachment feature 76, and the first base 70 is configured for attachment to a first surface 24. The first annulus 66 is connected to the first base 70 and comprises a first plurality of interior ribs 68. The connector 22 comprises a trunk 42 having first and second ports 44 at opposite ends thereof. In an exemplary embodiment, a first ridge band 56 is disposed on the trunk 42 and comprises an annular ridge 62, a plurality of dentils 58, and a gap 60 between adjacent dentils 58 of the plurality of dentils 58. The plurality of dentils 58 extend from the annular ridge 62 and toward one of the first and second ports 44. The gap 60 is configured to accept one of the first plurality of interior ribs 68 of the first bracket 26.

In an exemplary embodiment, a brace 72 connects the first base 70 and the first annulus 66. In an exemplary embodiment, the first attachment feature 76 is an aperture. In an exemplary embodiment, the first plurality of interior ribs 68 are evenly spaced about the first annulus 66. In an exemplary embodiment, the plurality of dentils 58 are evenly spaced about the first ridge band 56.

In an exemplary embodiment, connector 22 comprises a branch 46 that extends from the trunk 42, the branch 46 terminating in a third port 48. In an exemplary embodiment, the third port 48 has a different diameter than the first port 44. In an exemplary embodiment, the second port 44 has a different diameter than the first port 44. In an exemplary embodiment, the trunk comprises a bend.

In an exemplary embodiment, connector 22 comprises a second ridge band 56. In an exemplary embodiment, the first ridge band 56 is positioned at a first distance from the first port 44, and the second ridge band 56 is positioned at the same distance from the second port 44.

In an exemplary embodiment, system 20 comprises a second bracket 26. The second bracket 26 comprises a second base 70 and a second annulus 66. The second base 70 comprises a second attachment feature 76. The second annulus 66 is connected to the second base 70 and comprises a second plurality of interior ribs 68. In an exemplary embodiment, the first bracket 26 is attached to the first ridge band 56, and the second bracket 26 is attached to the second ridge band 56. In an exemplary embodiment, a planar surface of the first base 70 configured for mounting to a surface is oriented orthogonal to a planar surface of the second base 70 configured for mounting to a surface.

In an exemplary embodiment, a method of mounting a first conduit 28, 30 on a first surface 24 comprises providing a connector 22, the connector 22 comprising a trunk and a first ridge band 56 disposed on the trunk 42. The trunk 42 has first and second ports 44 at opposite ends thereof. The first ridge band 56 comprises a first plurality of gaps 60. The method comprises sliding a first bracket 26 past the first port 44 and onto the first ridge band 56. The first bracket 26 comprises a first annulus 66, the first annulus 66 comprising a first plurality of interior ribs 68 that fit into the first plurality of gaps 60. The first bracket 26 comprises a first base 70 connected to the first annulus 66. The method comprises mounting the first base 70 to the first surface 24 and attaching the first conduit 28, 30 to the first port 44.

In an exemplary embodiment, the connector 22 comprises a second ridge band 56 disposed on the trunk 42, the second ridge band 56 comprising a second plurality of gaps 60. The method comprises sliding a second bracket 26 past the second port 44 and onto the second ridge band 56. The second bracket 26 comprises a second annulus 66, the second annulus 66 comprising a second plurality of interior ribs 68 that fit into the second plurality of gaps 60. In an exemplary embodiment, the second bracket 26 comprises a second base 70 connected to the second annulus 66, the method comprising mounting the second base 70 to the first surface 24. In another exemplary embodiment, the method comprises mounting the second base 70 to a second surface 24 that is oriented orthogonal to the first surface 24. In an exemplary embodiment, the method comprises attaching a second conduit 28, 30 to the second port 44. In an exemplary embodiment, sliding the first bracket 26 onto the first ridge band 56 comprises stopping the sliding when the first plurality of interior ribs 68 contacts a stop ring 62 of the ridge band 56.

In an exemplary embodiment, an apparatus 22 comprises a body and a first ridge band 56. The body has first and second ports 44 at opposite ends thereof. The first ridge band 56 is disposed on a substantially cylindrical portion of the body. The first ridge band 56 comprises a plurality of dentils 58 and a gap 60 between adjacent dentils 58 of the plurality of dentils 58. The plurality of dentils 58 are raised from a surface of the substantially cylindrical portion of the body. The gap is elongated in an axial direction 64 of the substantially cylindrical portion of the body and terminates at a stop 62 that is raised from the surface.

In an exemplary embodiment, the first port 44 is disposed on a first end section 82, and the second port 44 is disposed on a second end section 82; the first end section 82 and the second end section 82 are movable relative to each other. In an exemplary embodiment, a first wedge section 84 is attached to the first end section 82. In an exemplary embodiment, the first wedge section 84 is movable relative to the first end section 82.

In an exemplary embodiment, the first end section 82 comprises a first angled opening 88 opposite the first port 44; the first wedge section 84 comprises a second angled opening 88; and the first angled opening 88 is rotatable relative to the second angled opening 88. In an exemplary embodiment, a ring 86 connects the first end section 82 and the first wedge section 84 at their first and second angled openings 88.

In an exemplary embodiment, the first angled opening, at a first point, is inclined at about 75 degrees (angle alpha) relative to the substantially cylindrical portion of the body; and at a second point diametrically opposed from the first point, is inclined at about 105 degrees (angle beta) relative to the substantially cylindrical portion of the body. In an exemplary embodiment, the first wedge section 84 has a substantially cylindrical wall; the second angled opening, at a third point, is inclined at about 75 degrees (angle alpha) relative to the substantially cylindrical wall; and at a fourth point diametrically opposed from the third point, is inclined at about 105 degrees (angle beta) relative to the substantially cylindrical wall.

In an exemplary embodiment, the first wedge section 84 comprises a third angled opening 88 opposite the second angled opening 88. In an exemplary embodiment, a second wedge section 84 comprises a fourth angled opening 88, wherein the fourth angled opening 88 is rotatable relative to the third angled opening 88. In an exemplary embodiment, the second wedge section 84 comprises a fifth angled opening 88 opposite the fourth angled opening 88. In an exemplary embodiment, a second end section 82 comprises a sixth angled opening 88, wherein the sixth angled opening 88 is rotatable relative to the fifth angled opening 88. In an exemplary embodiment, the second end section 82 comprises a second ridge band 56.

Although the subject of this disclosure has been described with reference to several embodiments, workers skilled in the art will recognize that changes may be made in form and detail without departing from the scope of the disclosure. In addition, any feature disclosed with respect to one embodiment may be incorporated in another embodiment, and vice-versa. All references mentioned in this disclosure are hereby incorporated by reference.

The invention claimed is:

1. An apparatus comprising:
a body having first and second ports at opposite ends thereof; and
a first ridge band disposed on a substantially cylindrical portion of the body, the first ridge band comprising:
a plurality of dentils raised from a surface of the substantially cylindrical portion of the body; and
a gap between adjacent dentils of the plurality of dentils, wherein the gap is elongated in an axial direction of the substantially cylindrical portion of the body and terminates at a stop that is raised from the surface.

2. The apparatus of claim 1, wherein the plurality of dentils are evenly spaced about the first ridge band.

3. The apparatus of claim 1, comprising a branch that extends from the body, the branch terminating in a third port.

4. The apparatus of claim 3, wherein the third port has a different diameter than the first port.

5. The apparatus of claim 1, wherein the second port has a different diameter than the first port.

6. The apparatus of claim 1, wherein the body comprises a bend.

7. The apparatus of claim 1, comprising a second ridge band.

8. The apparatus of claim 7, wherein:
the first ridge band is positioned at a first distance from the first port; and
the second ridge band is positioned at the first distance from the second port.

9. The apparatus of claim 1, wherein:
the first port is disposed on a first end section; and
the second port is disposed on a second end section;
wherein the first end section and the second end section are movable relative to each other.

10. The apparatus of claim 9 comprising a first wedge section attached to the first end section.

11. The apparatus of claim 10, wherein the first wedge section is movable relative to the first end section.

12. The apparatus of claim 11, wherein:
the first end section comprises a first angled opening opposite the first port;
the first wedge section comprises a second angled opening; and
the first angled opening is rotatable relative to the second angled opening.

13. The apparatus of claim 12 comprising a ring that connects the first end section and the first wedge section at their first and second angled openings.

14. The apparatus of claim 12, wherein the first angled opening:
at a first point, is inclined at about 75 degrees relative to the substantially cylindrical portion of the body; and
at a second point diametrically opposed from the first point, is inclined at about 105 degrees relative to the substantially cylindrical portion of the body.

15. The apparatus of claim 14, wherein the first wedge section has a substantially cylindrical wall, and wherein the second angled opening:
at a third point, is inclined at about 75 degrees relative to the substantially cylindrical wall; and
at a fourth point diametrically opposed from the third point, is inclined at about 105 degrees relative to the substantially cylindrical wall.

16. The apparatus of claim 12, wherein the first wedge section comprises a third angled opening opposite the second angled opening.

17. The apparatus of claim 16 comprising a second wedge section comprising a fourth angled opening, wherein the fourth angled opening is rotatable relative to the third angled opening.

18. The apparatus of claim 17, wherein the second wedge section comprises a fifth angled opening opposite the fourth angled opening.

19. The apparatus of claim 18 comprising a second end section comprising a sixth angled opening, wherein the sixth angled opening is rotatable relative to the fifth angled opening.

20. The apparatus of claim 19, wherein the second end section comprises a second ridge band.

* * * * *